United States Patent [19]

Gerber

[11] Patent Number: 4,793,625
[45] Date of Patent: Dec. 27, 1988

[54] PORTABLE BOAT TRAILER

[76] Inventor: Donald E. Gerber, Rte. 2, Box 21A, Seqiu, Wash. 98381

[21] Appl. No.: 124,252

[22] Filed: Nov. 23, 1987

[51] Int. Cl.$^4$ .............................................. B60P 3/10
[52] U.S. Cl. ..................................... 280/414.1; 280/63
[58] Field of Search ............... 280/414.1, 414.2, 414.3, 280/491 R, 491 A, 491 E, 656, 47.13 B, 63; 114/344

[56] References Cited

U.S. PATENT DOCUMENTS

| | | | |
|---|---|---|---|
| 2,594,540 | 4/1952 | Cole et al. | 280/656 X |
| 2,938,735 | 5/1960 | Bennett | 280/414.1 X |
| 4,214,774 | 7/1980 | Kluge | 280/414.1 X |
| 4,601,481 | 7/1986 | Maurice | 280/47.13 B |

Primary Examiner—John A. Pekar
Attorney, Agent, or Firm—William I. Beach

[57] ABSTRACT

A small boat trailer consists of a pair of spaced wheeled housing aligned and loosely supported apart by spacing members. A telescopic tongue has a rear end portion loosely connected to one of the spacing members. Included are two transverse cables connected to the spaced housings and a longitudinal cable connected to the opposite ends of the tongue. The structural members are forced together into a firm body by tightening all cables.

12 Claims, 3 Drawing Sheets

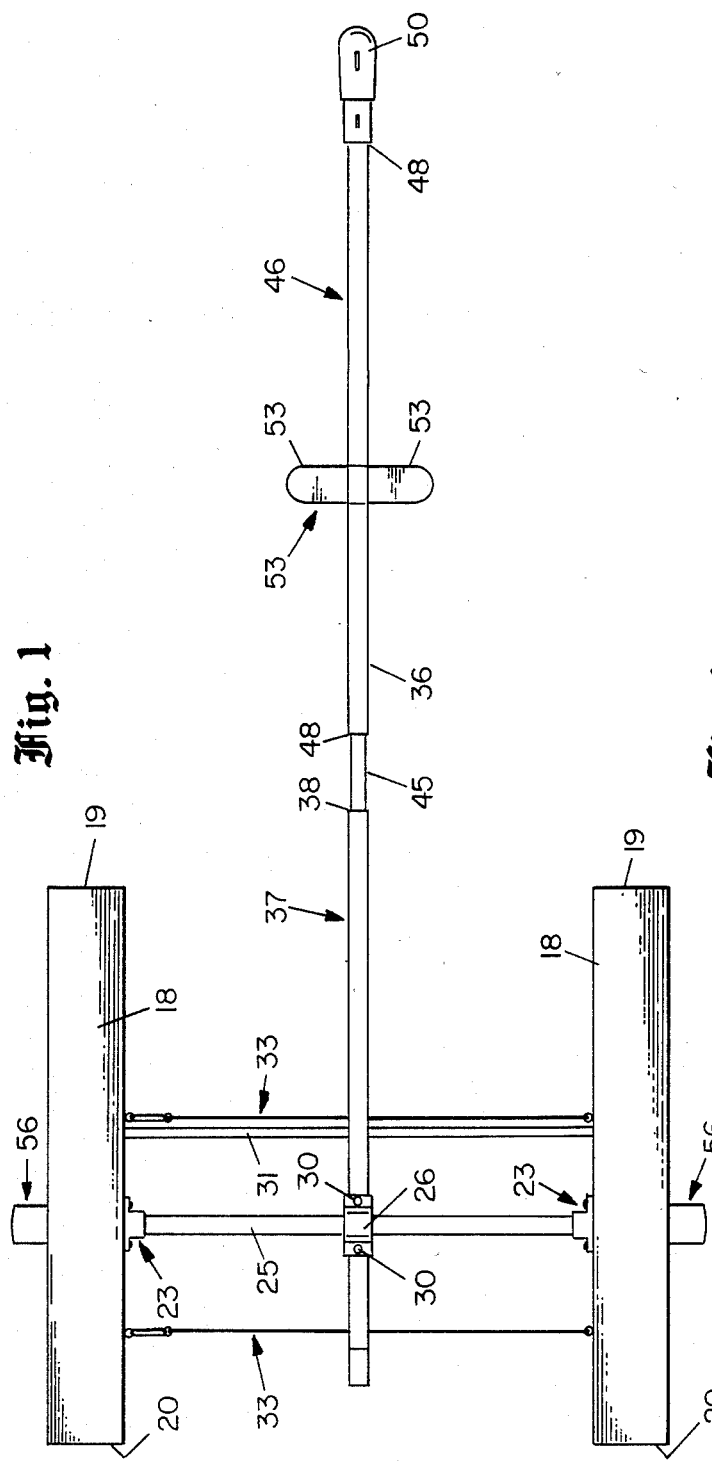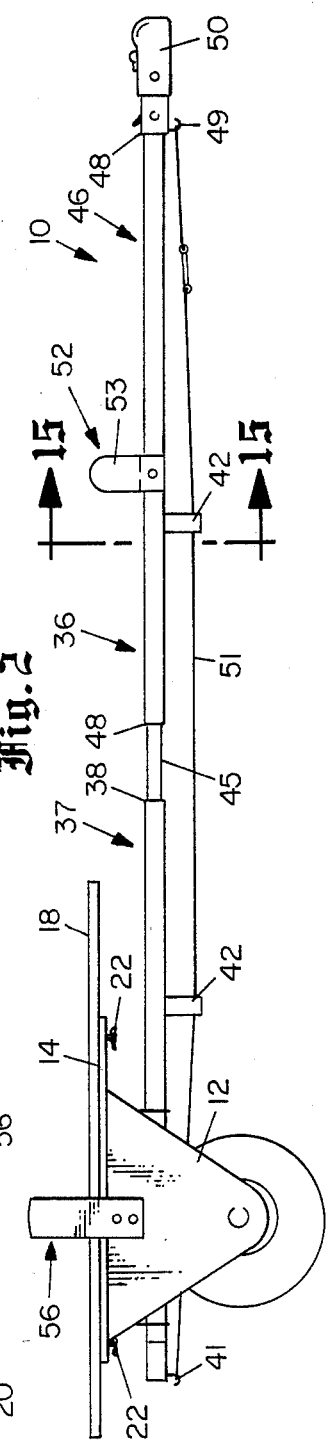

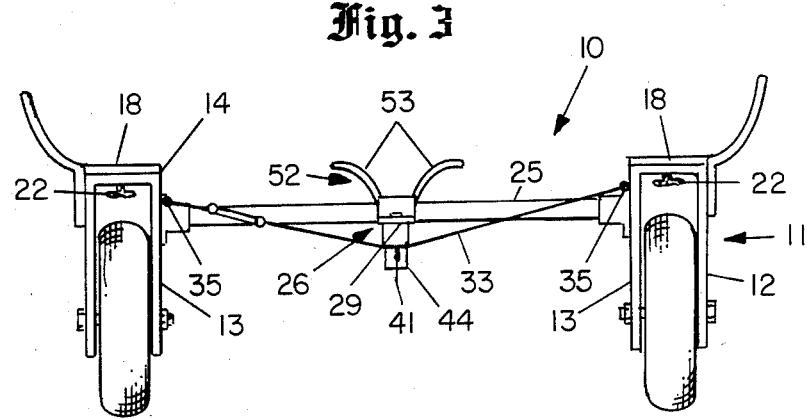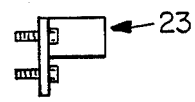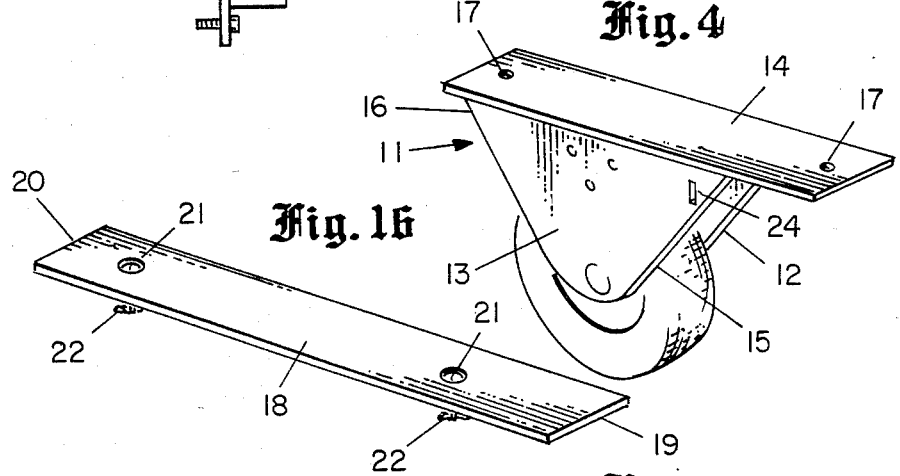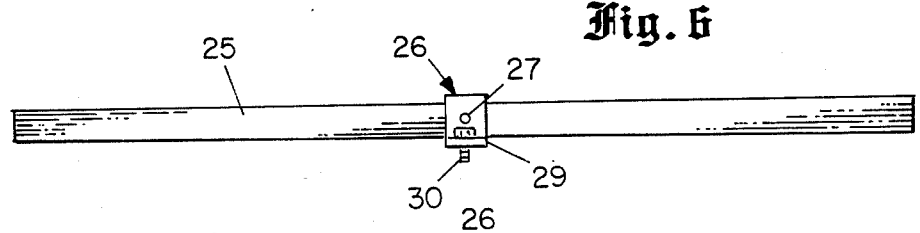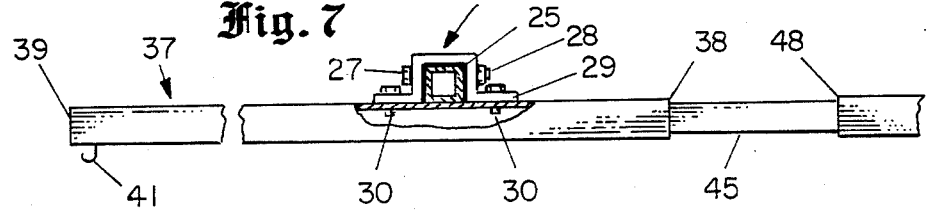

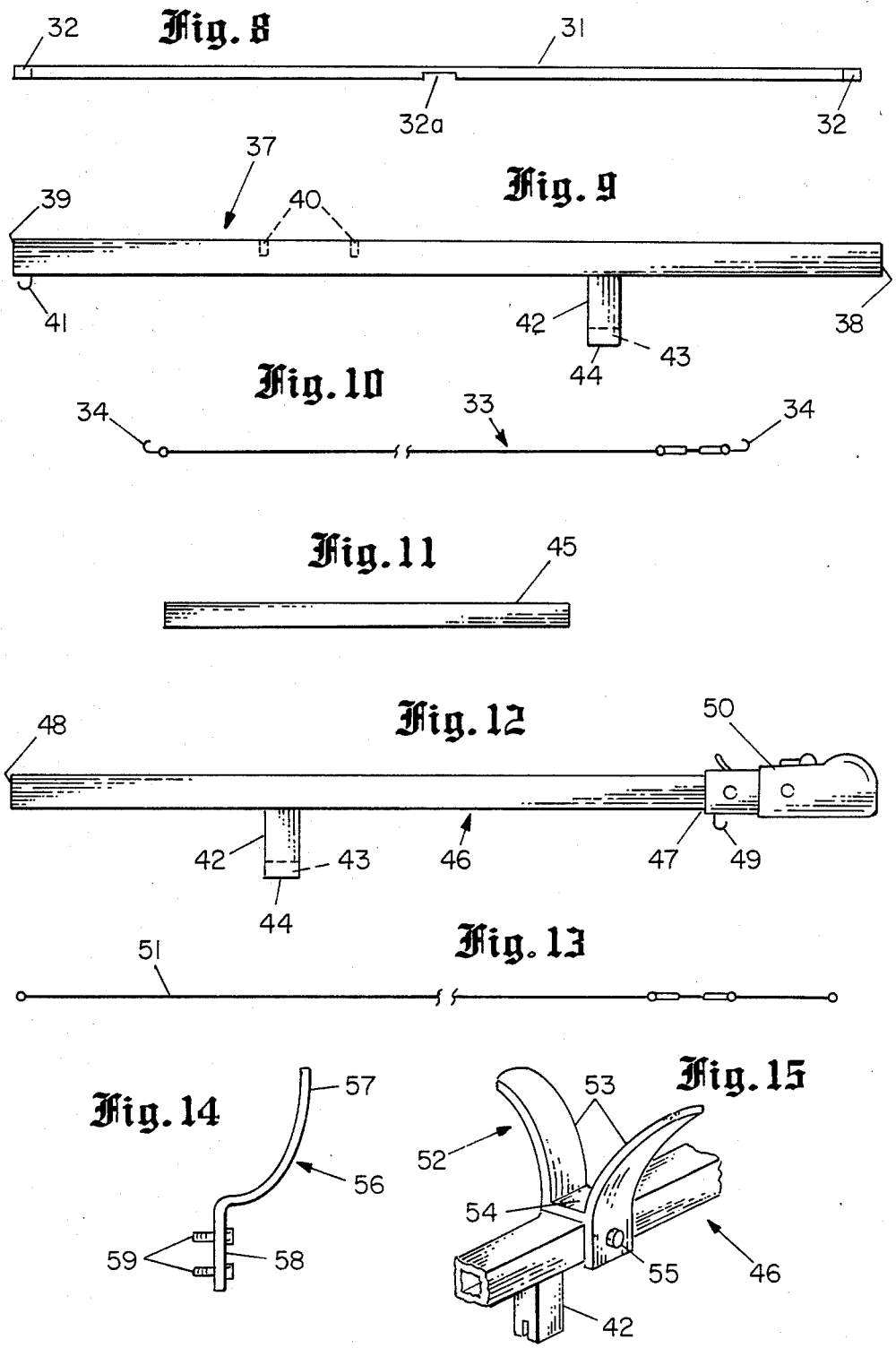

PORTABLE BOAT TRAILER

BACKGROUND OF THE INVENTION

1. Field of the Invention

The present invention relates to trailers and more particularly to small boat trailers that can be assembled or disassembled for storage after transporting and launching a boat in a body of water.

2. Description of the Prior Art

A novelty search of boat trailers disclosed a dolly type trailer and a towing trailer. Both provide some problems with cost, assembling and disassembling of the trailer structure requiring considerable time and effort.

For example, a dolly type of carrier is disclosed in a Pat. No. 4,214,774 issued to Ronald P. Kluge. The dolly consists of an elongated tongue connected to a wheeled support section. The tongue includes three tube lengths joined together in mechanical joints. One end of each tube slides into the open end of an adjoining tube. On the entering tube is a stop washer welded thereon to limit depth of penitration. The end of the receiving tube is threaded and split. Included on the split end is a ring member which has tapered internal threads. The ring member may be turned whereupon the split end is compressed to hold the end of the entering tube tightly within the receiving tube. The connection of the third tube to the wheeled section is done in a similar manner.

A sectional boat trailer is disclosed in U.S. Pat. No. 2,938,735 issued to J. C. Bennett. Like Kluge, Bennett suggest a structure comprising disassembling means. Unlike Kluge, however, Bennett's trailer is a heavy, full size carrier. The tongue consists of three sections of three spaced tubes welded to the ends of several transversely placed tubes as seen in plan view. Similarly, a fourth tube is spaced connected beneath the upper middle tube by vertical tubes as seen in the side vertical view. The tongue is separated into three of the above described sections connected together by the female ends of a section enclosed over solid cylindrical extensions projecting out of the female ends of an adjoining section. A pin is inserted in a hole extending through the joined sections holding them together. The wheeled portion of the trailer assembled in two sections are similarly pinned to each other and to an end of the tongue. A towing hitch is welded on the other end.

The patents discussed above suggests boat carrying structures that may be readily disassembled. Kluge takes his carrier apart by manually separating the joints by turning a threaded member on a split end connection to another member. The wheeled section is similarly separated and folded. This requires considerable time and effort to take the structure apart for storage. Further, the shape and size of the separated sections will require considerable space for storage.

Bennett's system for disassembling his trailer is like Kluge's except that the sections of his structure are heavier and longer. Separating the joints will obviously take more time and effort, and the storage problem is even greater.

In view of the above references, it is the object of the present invention to provide a boat trailer that will solve the aforementioned problems. The structural members of the present invention are neither welded in sections, assembled with pins or mechanically joined together. With some minor exceptions, the structural member consists of straight lengths of light tubing loosely connected and then pressed into a strong and rigid structure by external means. This novel feature provides simple, rapid and inexpensive means for assembling and taking apart the trailer of the present invention.

SUMMARY OF THE INVENTION

In carrying out the principles of the present invention in accordance with a preferred embodiment thereof a portable trailer is adapted to be assembled, transport and launch a small boat in a body of water and rapidly disassembled for storage in the boat or the towing vehicle. The trailer comprises a pair of housings rotatably mounted on conventional wheels. The housing consists of two parallel upright webs connected at their edges to the opposite side edges of an upper supporting panel. The ends of the panel have a length extending beyond the rear and front side edges of the webs. One of the webs of both housings include a slotted opening through the face of the web adjacent to the front edge. A socket member is mounted on the face of the slotted web between the front and rear side edges on both housings. The housings are set apart by a first spacing connection which has opposite end loosely inserted in the sockets. A square band connecting member is mounted a straddle of the first spacing connection intermediate of the sockets. The band has horizontal flanges formed on both sides and normal to the spacing connection. A connecting pin extends downwardly through both flanges. A second spacing connection also extends between the housings with opposite ends loosely engaged in the slots on opposite webs. The wheeled housings are likewise connected loosely to an elongated tongue comprised of a first and third length slidably enclosed over a second length. The first length also has two spaced holes therein adapted to mate loosely with the square band pins. There is a hook fastened on the first and third lengths adjacent to their outer ends. Included further is a conventional towing hitch fastened to the third length's outer end.

A pair of adjustable cables are loosely connected between the housings to the upper supporting panel. One cable has ends fastened to the rear end portion and the other to the front end portion of the upper supporting panel. There are means in connection with the cables for binding the first and second connection member and the housings into a rigid parallel frame for supporting the stern portion of a boat. Another longitudinal cable is led along the tongue with the ends looper over the hooks on the first and third lengths. Included is means with the longitudinal cable for applying an axial load on the tongue for securing the three lengths in rigid position for towing behind a vehicle. A cradle is fastened to the third length to support the bow portion of a boat. A pair of spaced arcuate members are fastened to the outer face of the webs opposite of the socket bearing webs for supporting the stern portion on the supporting panel. The trailer provides means for dismantling the structural members and which may be quickly separated for storage.

A BRIEF DESCRIPTION OF THE DRAWING

FIG. 1 is a plan view of the structure of the present invention,

FIG. 2 is an elevated side view of the trailer,

FIG. 3 is an elevated rear end view of the trailer,

FIG. 4 is a perspective side view of one of the wheeled housings showing the webs connected to an upper supporting panel, FIG. 5 is an elevated side view of a socket member secured to the side of the webs, FIG. 6 is an elevated side view of a spacing connection disposed between a pair of the housings, FIG. 7 is an elevated end view of a square band mounted on a spacing connection of FIG. 6 showing a pair of pins extending through the side flanges, FIG. 8 is an elevated side view of another spacing connection showing a square notch in a side portion, FIG. 9 is a side view of a first tube length of the trailer tongue showing a downwardly extending hook on the ends and two holes for receiving the pins shown on the square band flanges.

FIG. 10 is an adjustable cable of which there are two connected across the two housings, FIG. 11 is a side view of a second tube length that is slidably engaged in the first length, FIG. 12 is a side view of a third tube length slidably enclosed over the second tube, FIG. 13 is another cable having end hooks for engaging the hooks on the first and third tube lengths, FIG. 14 is an elevated side view of an arcuate member for supporting the side portions of a boat, and, FIG. 15 is a perspective view of a cradle mounted on the third tube length for supporting the bow portion of a boat.

FIG. 16 is a perspective view a panel which may be installed on the supporting panel for providing more resting area for the bottom of the boat.

A DETAILED DESCRIPTION OF THE PRESENT INVENTION

Referring to FIGS. 1-4, it can be seen that a boat trailer 10 includes a pair of spaced housings assembled with two spacing members and two adjustable cables. The housings are rotatably mounted on conventional wheels. Connected to the two spacing members is an elongated tongue consisting of two outside tubes slidably enclosing an inner tube. The tubes are held together with an elongated adjustable cable.

The trailer 10 comprises a pair of U-shaped housings 11 consisting of a pair of spaced V-shaped webs 12 and 13 connected to a horizontal supporting panel 14. Panel 14 is relatively narrow. The length extends a little distance beyond the front and rear side edges 15 and 16 respectively of webs 12 and 13. There are two spaced holes 17 located adjacent to the front and rear ends of panel 14. A second panel 18 has a front and rear end 19 and 20 extending a little distance beyond the distal ends of panel 14 and is secured thereto by a bolt and wingnut fasteners 21 and 22 extending through holes 17 of panel 14. A socket member 23, as may be seen in FIGS. 1-3 and 5, is mounted on the outside face of web 13 in horizontal alignment with housings 11 facing each other. Further, there is a slot 24 located on the face of web 13 adjacent to the front edge 15. Separating the housings is a first spacing connection 25, consisting of a square tube which has opposite ends loosely inserted in a socket member 23. Straddling the center of member 25 is a square band 26 reference FIGS. 6 and 7. A bolt and nut fastener 27 and 28 clamps the band to the first spacing member 25. At the opening end of the band the sides are formed outwardly into horizontal flanges 29. A pin 30 extends downwardly through each flange. Separating the housings 11 is a second spacing connection 31, also a separate tube, disposed forwardly of the first spacing member 25. Connection 31 has the opposite ends contoured in the shape of a lug 32 to fit loosely into slots 24. The first and second connections, while installed loosely, provide the structural means for framing the housings and connections into a wheeled carrier. For this purpose a pair of adjustable cables 33 are attached loosely to both housing. The ends 34 of a first cable 33 are fastened to webs 13 adjacent to the intersection of edge 16 with the upper supporting panel 14. The ends 34 of the second cable 33 are likewise fastened to webs 13 adjacent to the intersection of edge 15 with the upper supporting panel. Before tightening the two cables the first length of square tubing 37 forming a section of tongue 36 is aligned for a connection with the square band 26 mounted on first spacing connection 25. The first length 37, as shown in FIG. 9, has a front and rear end 38 and 39. Between the ends are two spaced holes 40 and a downwardly projecting square tube extension 42. There is a V-type notch 43 in the bottom edge 44. A hook 41 is connected to length 37 adjacent to end 39. To assemble first length 37 to the wheeled carrier the end 39 is passed over the second sagging cable 33, under the second spacing connection 31, under the first spacing connection and over the first sagging cable 33 until the holes 40 in length 37 are directly under the pins 30 in square band 26. The two cables are gradually tightened to bear upwardly on spaced parts of length 37 thereby bringing holes 40 in engagement with pins 30. Further, adjustment of the cables will mesh the holes 40 and pins 30 securely together to support length 37 in a rigid horizontal position. Further, the final adjustment of cables 33 to exert upward pressure on square band 26 mounted on first spacing connection likewise draws the housings 11 tightly together against the ends of the first and second spacing connection. Accordingly, the housings, spacing connections and the first length 37 are cinched securely together in a secure wheeled structure for carrying a boat thereon. Completing the tongue are the second and third tube lengths 45 and 46. The second lenghts 45 has one end slidably inserted in front end 38 of length 37 and the other end slidably inserted in the rear end 48 of the third length 46, as may be seen in FIGS. 1 and 2. Length 46 is similar to length 37 in that it also has an extension 42 mounted thereon and a hook 49 attached adjacent to the front end 48. A conventional trailer hitch is secured on the distal end 48. Tube lengths 37, 45 and 46 are slidably joined tightly together by an elongated cable 51. The ends of cable 51 are looped loosely over hooks 41 and 49 of tongue 36. The cable is tightened until it engages the V-like notch 43 in the bottom 44 of extension 42 mounted on lengths 37 and 46. Tightening the cable further exerts an axial load on the tongue bringing the ends 38 and 48 of lengths 37 and 46 tightly together. For supporting a boat on trailer 10 there is a cradle 52 mounted on length 46 for supporting the bow and two arcuate shaped side supports 56 mounted on webs 12 of housings 11 for the stern. The cradle consists of a pair of spaced arcuate shaped flanges 53 connected to a base plate 54 resting on length 46. The lower portion of the flanges extend downwardly to overlap two sides of length 46 and are fastened with fastener 55. The side supports 56 consists of an arcuate shaped top portion 57 connected to a straight portion 58. The top portion conforms substantially to the bottom sides of small boats. The straight portion is attached to the outside face of web 12 of both housings 11. A second panel 18, as seen in FIG. 16, may be installed on top of the supporting panel 14 if required to provide more resting area for the bottom of the boat. Panel 18 has a rear end 20 and front end 19 extending beyond both ends of supporting panel 14. It has been found that a panel of approximately 36 inches is sufficient for small boat, and particularly for an inflatable boat. Normally, it is preferred to place panel 18 so that end 20 overhangs the rear end of panel 14 substantially less then end 19 overhangs the front end. Holes 21 in panel 18 are aligned with holes 17 in panel 14 and are fastened thereon with bolts 21 and wing nuts 22.

The above detailed specification covers the assembling of trailer 10 of the present invention. However, the operation may be facilitated by inverting the wheeled housings 11 such that the upper supporting panels 14 rest flatly on the ground. In the upside down position access to the placement and securing of structural members can be done easily and more rapidly. This applies likewise when trailer is disassembled for storage. In taking the trailer apart, the cables 33 are unhooked from housings 11. The housings are then moved apart letting the spacing connections 25 and 31 fall to the ground along with tongue 36. Tube lengths 37, 45 and 46 are separated and the cradle 52 and side supports 56 are unfastened from lengths 37 and 46. The average time for taking the structure 10 apart is ten minutes. The total weight of this structure is 80 lbs. For storage the two housing can be put into one bag and the other pieces in another bag.

From the aforegoing description and illustration of the present invention it is obviously an important improvement and provides advantages over typical small boats trailers and the like.

The above description is to be clearly understood to be given by illustration and example only, the spirit and scope of the present invention being limited solely by the appended claims.

I claim:

1. An improved boat trailer adapted to be assembled and disassembled for storage in combination with standard wheels and a trailer hitch, wherein the improvement comprises:

a trailer comprising two housings rotatably mounted on wheels, having outwardly facing and non-facing webs, the facing webs facing each other in spaced alignment being connected to an upper supporting panel including front and rear ends extending beyond front and rear side edges on the webs, and including a slot disposed adjacent to the front edge of said facing webs, a socket member mounted on said facing web, a first spacing connection for setting apart the housings having opposite ends inserted loosely in the sockets, a connecting arch-like band for straddling the first spacing connection mounted intermediate of said sockets having a pair of horizontal side flanges and downwardly extending pins therethrough, a second spacing connection for setting the housings apart having shaped ends adapted to slip loosely into the facing web slot, an elongated telescopic tongue comprising first and third lengths having inner ends slidably enclosing a second length, the first length including two spaced holes therein adapted to mesh with the connecting band together with a hook on an outer end, and the third length likewise having a hook and a trailer hitch also mounted on an outer end, a pair of transversely adjustable cables loosely stretched between said housings underneath said first length having ends fastened to said facing webs adjacent to the supporting panel, means in cooperation with the transverse adjustable cables adapted to be tightened so as to bind said spacing connections and said first length together with said housing in a compact wheeled structure, an elongated adjustable cable having opposite ends formed to engage the hooks on the end of the telescopic tongue, means associated with the elongated cable for joining said first, second and third lengths into a united towing tongue, a bow cradle mounted on said third length of said tongue, a pair of arcuate side members for supporting the rear portion of a boat mounted on said housings, and, means whereby said trailer may be dismantled by the separation of the adjustable cables and the structural members.

2. The trailer as cited in claim 1, wherein: said housing is a U-shaped metal structure.

3. The trailer as cited in claim 1, wherein: said spacing connections and tongue lengths are square tubes.

4. The trailer as cited in claim 1, wherein: the connecting band is formed of a metal strap having a top, sides and horizontal flanges.

5. The trailer as cited in claim 1, wherein: said trailer further includes a plurality of tiedown straps for securing the boat on said wheeled housings and tongue.

6. An improved boat trailer adapted to be assembled and disassembled for storage in combination with conventional wheels and a trailer hitch, wherein the improvement comprises:

a trailer adapted to be assembled and disassembled for storage, comprising a pair of metal U-shaped housings rotatably mounted on wheels having outwardly facing and non-facing webs, the facing webs facing each other in spaced alignment being intimately secured to an upper base supporting panel and having opposite ends extending beyond front and rear side edges of said webs and including a slot therein adjacent to the front edge, the supporting panel further having a hole therethrough adjacent to each end, a square socket member mounted between said side edges, a rear square spacing tube for setting apart the housings with opposite ends loosely inserted in the sockets, a connecting device mounted and straddling the middle of the rear square spacing tube further having a top and spaced sides jointed to a pair of outwardly reaching flanges and including a pin extending downwardly therethrough, a front, square spacing tube for setting apart said housings including opposite ends formed in lug-like inserts for a loose connection with the slots in said facing webs, an elongated telescopic tongue consisting of a square first length having a pair of holes therein adapted to mesh with the pins in the connecting device, a hook secured to the outer end, and an inner end slidably enclosing an end of a square second length together with a square third length having a hook and a trailer hitch mounted adjacent to the outer end and likewise having an inner end slidably enclosing the other end of the second length, a pair of transversely adjustable cables loosely stretched between said housings underneath of said first square length having opposite ends fastened to said facing webs adjacent to the horizontal supporting panel on opposite sides of the rear square spacing tube, means in cooperation with the transversely adjustable cables adapted to be tightened so as to bind said front and rear square tubes and said first length securely together with said housings for a compact wheeled structure, an elongated, longitudinaly adjustable cable attached loosely to the hooks on the opposite ends of the tongue, means associated with the longitudinal adjustable cable adapted to be tightened and apply an axial force on said tongue and provide sufficient stiffness therein for towing said trailer, a cradle mounted on the third length having V-shaped side flanges adapted to contact and support the bow portion of a small boat, a pair of arcuate side members fastened on said housings non-facing webs, said webs being on the opposite side of said facing webs for supporting the stern portion of the boat, and means whereby said trailer may be dismantled by the separation of said transverse and longitudinal cables and said housings so that said rear and front spacing tubes fall to the ground, and said wheeled housings, said spacing tubes, and said cables being placed in two ordinary canvas bags.

7. The trailer as recited in claim 6, wherein:
said housings further includes a wood based second supporting panel mounted on said upper supporting panel through a pair of holes thereon with a wing fastener, the second panel providing further length surface for supporting the bottom of the boat.

8. The trailer as cited in claim 7, wherein:
the second supporting panel further includes a covering material thereon to provide a cushion for the bottom of said boat.

9. The trailer as recited in claim 6, wherein:
said square tubes are aluminum products.

10. The trailer as recited in claim 6, wherein:
said connecting device is a steel trap formed to the exterior shape of said rear square spacing tube, and fastened thereto, the bottom portion of the device being turned outwardly on both sides normal to said rear spacing tube in a pair of horizontal flanges.

11. The trailer as recited in claim 6, wherein:
the cradle comprises a pair of outwardly spreading arcuate flanges connected to a base member laying across a top side of said third tube length, the lower portion of the flanges extend downwardly along the vertical sides of the tube and are fastened thereto.

12. The trailer as recited in claim 6, wherein:
the arcuate side members consists of a tubler device that has an upper portion curved for engaging the rear bottom side of said boat and the lower portion flattened and straightened to provide fastening means.

* * * * *